PULSE TRANSMISSION ARRANGEMENT FOR TELEPHONE SYSTEMS
Filed Oct. 21, 1965
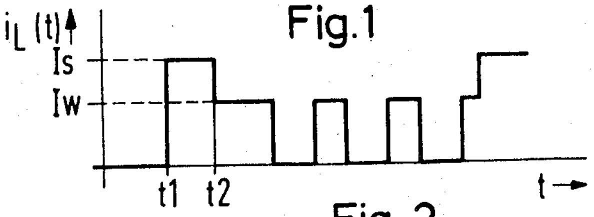
Fig. 1
Fig. 2
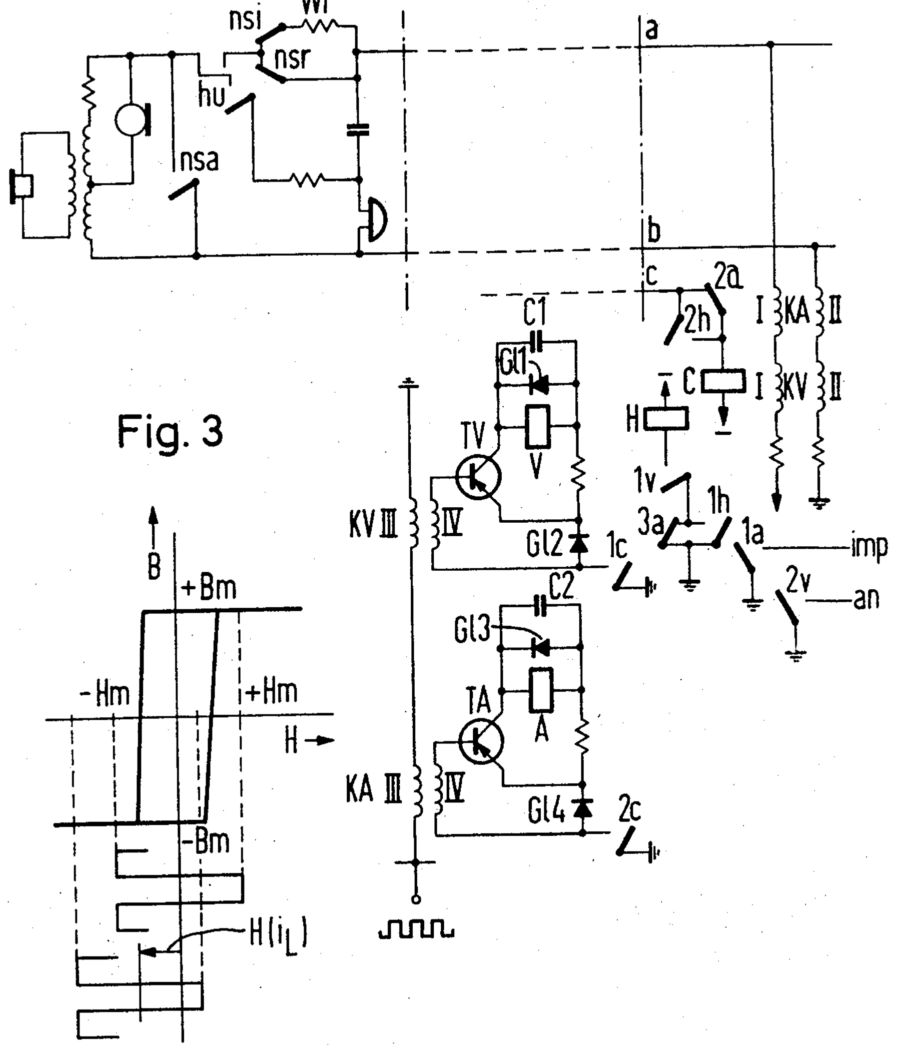
Fig. 2, Fig. 3

United States Patent Office 3,466,404

Patented Sept. 9, 1969

3,466,404

PULSE TRANSMISSION ARRANGEMENT FOR TELEPHONE SYSTEMS

Herbert Töpfer, Unterpfaffenhofen, Germany, assignor to Siemens Aktiengesellschaft, Erlangen, Germany Filed Oct. 21, 1965, Ser. No. 499,413
Claims priority, application Germany, Nov. 18, 1964, S 94,221
Int. Cl. H04m *1/26*
U.S. Cl. 179—90 5 Claims

ABSTRACT OF THE DISCLOSURE

A pule communication system, for example, for dial selection pulses in telephone systems. A signal is distinguished from a non-signal condition by reducing the current flow in the signal channel to a level different from the current flow in all other conditions.

General description

This invention concerns an arrangement for pulse transmission in communication systems, and more particularly for transmission of diol selection pulses in telephone systems.

In known apparatus of this kind, individual subscriber stations are connected to a first current pulse receiver, such as a group dial selector, or a repeater, when the subscriber hand apparatus is lifted. A current pulse receiving relay located in such receiver changes its operating condition in accordance with current changes caused by the current pulse sender, such as the dial-operated switch. These current changes correspond with the digit to be transmitted, and are usually simply a certain number of interruptions of the subscriber loop.

In the known system a device is made effective to supervise the time interval, when the pulse relay first changes its energization condition, and this time supervision device waits for a time period longer than the maximum time interval of two dial pulses, following the arrival of the last pulse of a series, to indicate the end of that pulse series. This time supervision device is indispensable, since the end of a pulse series is indicated only by the fact that no further pulses arrive within a given time period.

This known arrangement has the disadvantage that it requires a waiting period during which no steps in the formation of connections can be taken, and also that the dial switch must operate in a particular time interval which has quite narrow tolerances. That is, the number wheel must operate at a certain speed, within a very narrow tolerance range.

An object of the present invention is to avoid these disadvantages of the existing common dial system. The invention is characterized by the fact that the amplitude of current during the period of number pulse transmission is different from the current values on the line in all other conditions. The result is that there is no need for the use of time delay responsive devices to sense the termination of the dialing operation, and furthermore, the narrow tolerance for the speed of the number dial can be avoided, and in fact, that speed is no longer critical at all. Indeed, the time interval which the present system requires between dial pulses, which results in lengthening of the intervals between pulses, can be considerably reduced, since these added intervals are unnecessary with the system of the invention.

In accordance with the invention, the maximum value of the current on the line during number pulse transmission is less than the current which flows over the line when the dial is not being actuated. This can easily be arranged by use of a resistor connected in series with the pulse contacts of the number dial. The combination of these two elements can be shunted by the holding contacts of the number dial, so that the resistor is ineffective except when the dial is operating. The result is that the changes in current which occur by opening of the holding contacts of the dial, upon movement of the dial disc, or upon closing of those contacts after the dial switch operation has been completed, can be evaluated in the exchange station as signals for the beginning and end, respectively, of the pulse series. Such evaluation can be advantageously carried out with the aid of electronic switching means.

Detailed description

The invention will now be more fully described in conjunction with a drawing showing a preferred embodiment thereof;

In the drawing:

FIG. 1 is a line current versus time diagram showing the various conditions of operation of a system of the invention;

FIG. 2 is a partial schematic diagram showing the apparatus for creation of the different current levels during dialing, and the apparatus at the central location for evaluation of these various levels; and FIG. 3 is a plot of magnetic field intensity versus magnetic flux density for magnetic cores of the type used in the evaluating apparatus, showing operation thereof with different levels of field intensity.

As stated, FIG. 1 indicates the level of line current $i_L$, as a function of time ($t$). Previous to the instant $t1$, there is on line current in the apparatus of FIG. 2, because the handset is in position and the subscriber loop is not completed. At the moment $t1$, the handset or other hand apparatus is lifted to complete the subscriber loop and a level of current $I_s$ flows over the line for energization of the subscriber station.

At time $t2$ the number dial has been moved for the purpose of dialing a subscriber identification number, and the line current decreases to $Iw$. This decrease is caused by interruption of the shunt circuit provided by the holding contacts *nsr* around the series circuit including dial contacts *nsi* and resistor W*i*.

As indicated by FIG. 1, the current $Iw$ is periodically decreased to 0, in conventional fashion, by periodic opening of the dial switch contacts *nsi* in accordance with the number of the subscriber being dialed. For instance, eight interruptions would indicate the numeral eight. When the last number pulse has been transmitted upon completion of the dial switch operation, the holding contacts *nsr* are again closed, so that the line current increases once more to the level $I_s$.

These various changes in current are sensed by the evaluating apparatus of FIG. 2, including transistor-controlled relay switches. In FIG. 2, a pair of transformer magnetic cores of high permeability are employed, these cores having substantially rectangular hysteresis loops, as indicated in FIG. 3. The cores are each provided with four windings, identified by different Roman letters, to form transformers KA and KV.

Referring to FIG. 3, if no current is provided to any of the coils of the transformer cores KA and KV, those cores are in one of the two stable conditions identified by the remanence points $+Bm$, $-Bm$. It will be seen in FIG. 2 that the windings III of the transformers are connected in series to a source of square wave current. This source supplies current of a level such that the respective cores are periodically driven between the two magnetic intensity saturation points $+Hm$ and $-Hm$ and indicated by the upper square wave superimposed on the hysteresis curve of FIG. 3. The resultant change in magnetic flux density of the two cores of transformers KA and KV causes proportional alternating voltages to be developed in inductively-related windings IV of the two transformers.

These voltages are respectively amplified by transistors TA and TV connected in series with the windings IV through respective rectifiers G14 and G12. That is, the emitter to base circuit of each transistor is connected in series with one of the windings IV. The collector circuits of the two transistors include the operating coils of relays A and V, respectively, which relays are in turn shunted by rectifiers G13 and G11, respectively, each connected in parallel with filter capacitors C2 and C1, respectively. However, the energizing circuits for the relays are completed only through contacts 2*c* and 1*c*, for the relays A and V, respectively, so that these relays may be operated when the said voltages are developed across the windings IV of the corresponding transformers KA and KV.

The square wave current flowing through the windings III of transformers KA and KV is effective to supply such voltages to the windings IV only when the cores of the respective transformers are not driven into saturation by currents flowing through the respective windings I and II. These windings are connected in series with the *a* and *b* conductors of the telephone line, and the circuits are so arranged and the elements thereof so selected that the currents flowing in the windings I and II may be of magnitude such as to saturate the cores of the respective transformers and prevent the square wave of current flowing through windings III from switching the saturation condition of the cores. Such a sautration bias is shown at $H(i_L)$ in FIG. 3, and it is evident that the square wave is not large enough to reversely saturate the core. In such case, of course, no operation of relays A and V is possible, even if relay C is energized to close its contacts 1*c* and 2*c*.

The remaining parts of the apparatus of FIG. 2 will be described in conjunction with its operation, as follows. During idle condition when no line current flows, the relays A and V are de-energized, since the contacts 1*c* and 2*c* are open by reason of de-energization of relay C. If the hand apparatus at the subscriber station is raised to cause the supply current I*s* to flow over the subscriber line, the same current flows through the windings I and II of the transformers KA and KV. In addition, through the normal operation of apparatus normally provided for this purpose, the *c*-conductor is provided with ground potential to cause operation of relay C over a circuit including normally-closed contacts 2*a*. This seizure relay C is then operated to close the contacts 1*c* and 2*c* to prepare energizing circuits for the relays A and V. However, these relays cannot respond, since the level of current I*s* is sufficient to drive the cores of both transformers KA and KV into saturation.

When the number dial is moved to transmit an identifying number, the line current is reduced to I*w*, by reason of resistor W*i*. This level of current continues to cause saturation of the core of transformer KA, but is not sufficient to cause saturation of the core of transformer KV. The result is that the square wave of current flowing through winding III of transformer KV provides a voltage across winding IV sufficient when amplified by transistor TV, to energize relay V during the number pulses. The contacts 2*v* of relay V are connected to a conductor *an* which may be connected at the remote location to apparatus operative when supplied with ground potential to prepare for the reception of dial pulses.

The closure of contacts 1*v* then completes an energizing circuit for auxiliary relay H, over contacts 3*a*, and the auxiliary relay holds itself energized over its holding contacts 1*h*. Contacts 2*h* of the auxiliary relay complete a holding circuit for the seizure relay C, so that continued deenergization of relay A is not necessary to holding of the relay C.

During the intervals between pulses in line current, even the core of transformer KA is removed from saturation, so that the square wave of current flowing through its winding III is effective to cause operation of the relay A. This relay is then operated and de-energized, with the number-indicating pulses. Each time the relay operates, its contact 1*a* close to connect ground over the conductor *imp* to the remote location where a pulse receiver or other appropriate apparatus may respond to the number pulses.

When the last number pulse is transmitted, by completion of travel of the number dial, the holding contacts *nsr* are again closed to increase the line current to operating current I*s*. This current, as above indicated, is sufficient to throw both transformer cores into saturation and to cause de-energization of the relays A and V. De-energization of relay V causes opening of contacts 2*v*, which may be employed to indicate to the remote location that the dial pulse series has been completed.

The contacts 1*v* of course drop off to interrupt the operating circuit for auxiliary relay H, but the seizure relay is maintained energized through the contacts 2*a*, which are again closed upon de-energization of relay A.

It will be evident that many minor changes could be made in the apparatus specifically described herein, without departure from the scope of the invention. Accordingly, the invention is not to be considered limited to the preferred embodiments, but rather only by the scope of the appended claims.

I claim:

1. In a telephone system, an apparatus for transmitting selection signalling pulses to identify a called subscriber, of the type of dial number pulses, such transmission occurring over talking conductors connected in a loop when the calling subscriber lifts his handset, and provided with supply current of a certain magnitude, and with a pulse selector to cause transmission of the signalling pulses, the improvement comprising:

the series combination of first switch contacts and a resistor connected in series with one of the talking conductors, a second set of switch contacts connected across said series combination, said second contact set being connected to said pulse selector to be opened thereby and maintained opened so long as the selector is operated to cause transmission of signalling pulses, and said first contact set being connected to said selector to be successively opened and closed thereby to cause such pulse transmission, whereby the supply current flowing in the talking conductors is decreased to a certain level by operation of said selector, and means operable to recognize such decrease in current amplitude, to respond to the selection signalling pulses.

2. The apparatus of claim 1 in which said recognition means responds to reduction in current from the supply current level caused by opening of said second contact set, to indicate the beginning of a selector pulse series.

3. The apparatus of claim 2 in which said recognition means responds to an increase in current to said supply current level caused by closure of said second contact set, to indicate the end of a selector pulse series.

4. The apparatus of claim 1 in which said recognition means comprises a pair of saturable magnetic core transformers each having a first coil supplied with square wave pulses of current amplitude normally operable to drive the respective cores successively into reverse saturation conditions, each core also having other coil means connected to said talking conductors to respond to current flowing therein, both cores being saturated in one direction to such a degree by operating current level flowing in said talking conductors that the square wave pulses supplied to said first coils cannot cause reverse saturation thereof, the first core being also saturated in said one direction to such a degree by such decreased level of current flowing in said talking conductors during selection pulses that the square wave pulses supplied to said first coils cannot cause reverse saturation of the core, and both said cores being unsaturated by interruption of current flowing in said conductors resultant from opening of said first contact set, to such degree that the said square wave pulses can reverse saturate the cores, and means differently responsive to successive reverse saturations of each said core.

5. The apparatus of claim 4 in which said differently responsive means includes a pair of relays each connected to a different one of said transformers.

References Cited

UNITED STATES PATENTS

| | | | |
|---|---|---|---|
| 2,410,050 | 10/1946 | Deakin | 179—18 |
| 1,864,646 | 6/1932 | Edwards | 179—86 |
| 3,264,406 | 8/1966 | Cohen et al. | 178—4.1 |

KATHLEEN H. CLAFFY, Primary Examiner

D. L. RAY, Assistant Examiner